Nov. 24, 1936.    J. M. FORESTER    2,062,170
SANDWICH CUTTING MACHINE
Filed June 17, 1935
*Fig.1.*
*Fig.5.*
*Fig.4.*
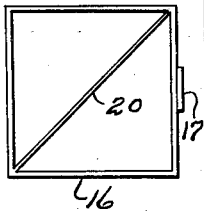
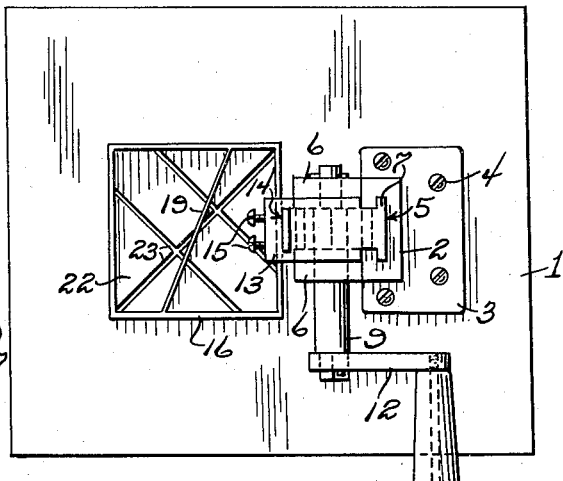
*Fig.2.*
*Fig.3.*
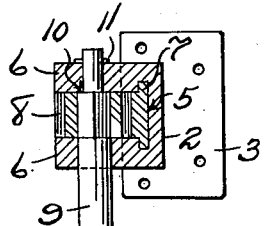
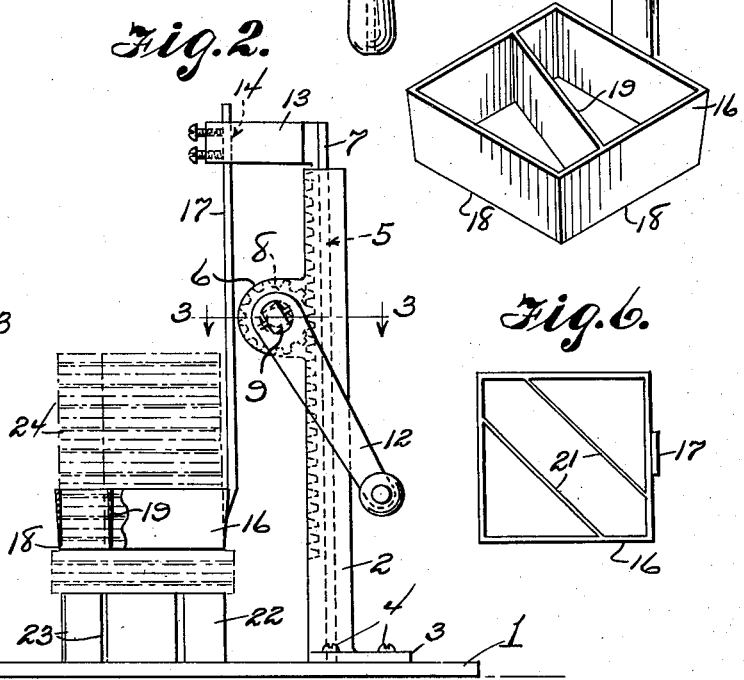
*Fig.6.*
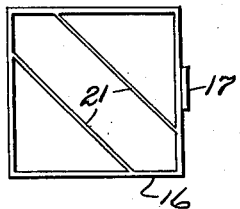
Jesse M. Forester
INVENTOR
BY Victor J. Evans & Co.
ATTORNEY Patented Nov. 24, 1936

2,062,170

UNITED STATES PATENT OFFICE 2,062,170

SANDWICH CUTTING MACHINE

Jesse M. Forester, Pennington Gap, Va.

Application June 17, 1935, Serial No. 27,096

2 Claims. (Cl. 146—160)

My invention relates to improvements in machines for cutting the crust from sandwiches, bread toast, or the like, and dividing such articles into sections.

The primary object of my invention is to provide a simply constructed easily operable machine for cutting through a number of sandwiches, or the like, to trim the crust off of same and simultaneously to cut them diagonally into two or more sections.

Another object is to provide a machine for the purposes above designated and which is particularly designed for performing the desired operations upon a stack of sandwiches, or the like, and for selectively varying the angular shape of the sections into which the articles are cut and also the number of sections.

Another object is to provide a machine for the purposes set forth which is strong, durable, and economical to manufacture.

To the accomplishment of the above, and subordinate objects presently appearing, a preferred embodiment of my invention has been illustrated in the accompanying drawing, described in detail in the following and designed in the claims appended hereto.

In said drawing:

Figure 1 is a view in top plan of a machine constructed according to my invention.

Figure 2 is a view in side elevation.

Figure 3 is a view in transverse section taken on the line 3—3 of Figure 2 looking in the direction indicated by the arrows.

Figure 4 is a view in perspective of a cutter frame with which the machine is equipped.

Figure 5 is a view in top plan of a modified form of cutter frame, and

Figure 6 is a similar view of another modified form of cutter frame.

In its illustrated embodiment, the cutting machine of my invention comprises a flat base portion 1 preferably rectangular and formed of a suitable hard wood such as hard maple. Arising from the base 1, adjacent one edge thereof, is a standard 2, preferably of metal, and formed with a base flange 3 by means of which the standard is secured to said base 1 as by screws 4. The standard 2 is provided with a T-shaped guide slot 5 therein, extending lengthwise thereof throughout the greater portion of the length of said standard and opening onto the front and upper end of the latter. A pair of opposed apertured ears 6 extend forwardly of the standard 2 upon opposite sides of said slot 5. A rack bar 7 conforming in shape to said slot 5 is slidably mounted therein for vertical movement in said standard. A rack bar 7 meshes with a toothed pinion 8 mounted between said ears 6 on a shaft 9 journaled in said ears and extending beyond the same. A shoulder 10 on said shaft, and a pin 11 in one end thereof prevent endwise movement of the shaft 9 in said ears. A hand crank 12 is suitably secured on one end of the shaft 9 for rotating the pinion 8 to elevate and lower the rack bar 7. At its upper end the rack bar 7 is provided with a forwardly extending arm 13, vertically slotted as at 14 and having threaded in its front face lag screws 15.

A rectangular cutter frame 16 is suspended from said arm 13 by means of a shank 17 on said frame adjustably and removably secured at its upper end in said slot 14 by the lag screws 15. The frame 16 is provided with lower cutting edges 18 and is of the requisite size to slice the crust from the usual slice of sandwich bread. Within the frame 16 and extending diagonally across same are one or more cutting blades, as the case may be, for separating the sandwich along oblique lines of the sections. In Figure 4 a single blade 19 has been shown, whereas, in Figure 5 a single blade 20 has been shown disposed at a different angle from the blade 19, and in Figure 6 two parallel diagonally disposed blades 21 are shown cutting the article into three sections along oblique lines. It is to be understood that the various forms of frames shown are interchangeable, to vary as desired the angular form of the sections into which the sandwiches are divided and the number of sections.

Secured to the base 1 in any suitable manner is a stripper and die block 22 which is centered relatively to the cutter frame 16 and is of the same shape but sufficiently smaller to permit the cutter frame to descend around the same. The stripper block 22 has formed therein a plurality of through slots 23 diagonally disposed in correspondence with the inclination of the various blades 19, 20, and 21 so that the latter may descend down into the block.

Referring to the use of the machine, the cutter frame 16 is first elevated by rotation of the hand crank 12 in the counterclockwise direction to the limit of its upward movement. A stack of sandwiches, represented by 24, is disposed upon the block 22 with the sides of the sandwiches vertically aligned. The cutter frame 16 is then lowered by operation of the hand crank 12 to the limit of its downward movement as determined by engagement of its cutting edges with the base 1. During this operation, as will be clear, the crust is sliced off the sandwiches and the latter are cut into sections. The sandwiches may then be removed. As will be seen, the block 22 functions to strip the cutter frame including the blades 19, 20, and 21, as the case may be, of particles of bread and sandwich filler so that said frame and knives are automatically cleaned. The described machine is of particular utility as a means for saving time and labor and cutting sandwiches or bread into sections of uniform size. It, furthermore removes the danger of cutting the hands and can be economically manufactured for sale for household use as a kitchen utensil.

Although certain details of construction have been specified in the foregoing, it is to be understood that the present disclosure is illustrative rather than restrictive and right is herein reserved to modification in detail falling within the scope of the protection prayed.

What I claim is:

1. In a sandwich slicing machine a base, a standard, a rack bar supported on the standard, said rack bar having at the upper end a laterally extending arm, a revoluble pinion on the standard engaging the rack bar, a cutting frame fixed to said arm, said cutting frame being provided with a diagonally disposed blade, and means for stripping the frame and blade of particles of bread and sandwich filler so that the frame and blade are automatically cleaned, comprising a stripper block on the base centered relatively to the cutting frame and of the same shape but sufficiently smaller to permit the cutting frame to descend around the block, the stripper block having formed therein a slot diagonally disposed in correspondence to the inclination of the cutting blade so that the latter may descend into the block.

2. In a sandwich slicing machine, a frame rectangular in shape and having the edges thereof on one side sharpened, a diagonally disposed cutting blade in the frame, means for moving the frame along a predetermined path, and a stationary stripper block centered with respect to the frame and disposed in the path of the frame, said stripper block being of the same shape as the frame but being sufficiently smaller than the frame to permit the frame to telescope around the block, the stripper block having formed therein a slot diagonally disposed to receive the diagonally disposed cutting blade, said block cleanly dislodging crumbs and sandwich fillers from the corners of the frame and angles at the intersections of the blade with the frame each time the frame completes its stroke.

JESSE M. FORESTER.